United States Patent
Yang et al.

(10) Patent No.: US 7,990,739 B2
(45) Date of Patent: Aug. 2, 2011

(54) ASYMMETRICAL RESONANT POWER CONVERTERS

(75) Inventors: Ta-Yung Yang, Milpitas, CA (US);
Ying-Chieh Su, Taipei County (TW);
Tien-Chi Lin, Taipei County (TW);
Shih-Hung Hsieh, Taipei (TW)

(73) Assignee: System General Corporation, Sindian City, Taipei County (TW)

( * ) Notice: Subject to any disclaimer, the term of this patent is extended or adjusted under 35 U.S.C. 154(b) by 2 days.

(21) Appl. No.: 12/545,971

(22) Filed: Aug. 24, 2009

(65) Prior Publication Data
US 2010/0202162 A1 Aug. 12, 2010

Related U.S. Application Data

(60) Provisional application No. 61/207,353, filed on Feb. 10, 2009.

(51) Int. Cl.
*H02M 3/335* (2006.01)
(52) U.S. Cl. .................. 363/21.02; 363/18; 363/21.07; 363/21.09

(58) Field of Classification Search ............. 363/16, 363/19, 20, 21.02, 21.03, 21.07, 21.1, 21.11, 363/56.01
See application file for complete search history.

(56) References Cited

U.S. PATENT DOCUMENTS

| | | | | |
|---|---|---|---|---|
| 6,154,375 A * | 11/2000 | Majid et al. | | 363/16 |
| 7,313,004 B1 * | 12/2007 | Yang et al. | | 363/21.02 |
| 7,684,220 B2 * | 3/2010 | Fang et al. | | 363/56.1 |
| 7,778,050 B2 * | 8/2010 | Yamashita | | 363/21.16 |
| 2010/0020569 A1 * | 1/2010 | Melanson et al. | | 363/21.03 |

\* cited by examiner

*Primary Examiner* — Adolf Berhane
*Assistant Examiner* — Nguyen Tran
(74) *Attorney, Agent, or Firm* — Thomas|Kayden (57) ABSTRACT

A resonant power converter is provided and includes a capacitor, an inductive device, a first transistor, a second transistor, and a control circuit. The capacitor and the inductive device develop a resonant tank. The first transistor and the second transistor are coupled to switch the resonant tank. The control circuit generates a first signal and a second signal to control the first transistor and the second transistor respectively. Frequencies of the first signal and the second signal are changed for regulating output of the resonant power converter. The control circuit is further coupled to detect an input voltage of the resonant power converter. A pulse width of the second signal is modulated in response to change of the input voltage.

10 Claims, 8 Drawing Sheets

ASYMMETRICAL RESONANT POWER CONVERTERS

CROSS REFERENCE TO RELATED APPLICATIONS

The present application claims the benefit of U.S. provisional application entitled "Asymmetrical Resonant Power Converter", Ser. No. 61/207,353, filed Feb. 10, 2009.

BACKGROUND OF THE INVENTION

1. Field of the Invention

The present invention relates to power converters, and more particularly, relates to the asymmetrical resonant power converter.

2. Description of the Related Art

The resonant power converter is a high efficiency power converter. However, the narrow operation range is its drawback. When the input voltage has a significantly change, its operation might fall into a none-linear region. The object of the present invention is to provide a control scheme to solve this problem. It allows the resonant power converter can be operated in a wide input voltage range.

BRIEF SUMMARY OF THE INVENTION

An exemplary embodiment of a resonant power converter comprises a capacitor, an inductive device, a first transistor, a second transistor, and a control circuit. The capacitor and the inductive device develop a resonant tank. The first transistor and the second transistor are coupled to switch the resonant tank. The control circuit generates a first signal and a second signal to control the first transistor and the second transistor respectively. Frequencies of the first signal and the second signal are changed for regulating output of the resonant power converter. The control circuit is further coupled to detect an input voltage of the resonant power converter. A pulse width of the second signal is modulated in response to change of the input voltage.

Another exemplary embodiment of a power converter comprises a capacitor, an inductive device, two transistors, and a control circuit. The capacitor and the inductive device developing a resonant tank. The two transistors are coupled to switch the resonant tank. The control circuit generates switching signals coupled to control the transistors. Frequencies of the switching signals are varied for regulating output of the power converter. The control circuit is coupled to detect a voltage of the capacitor for modulating the switching signals and change a DC bias of the capacitor.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
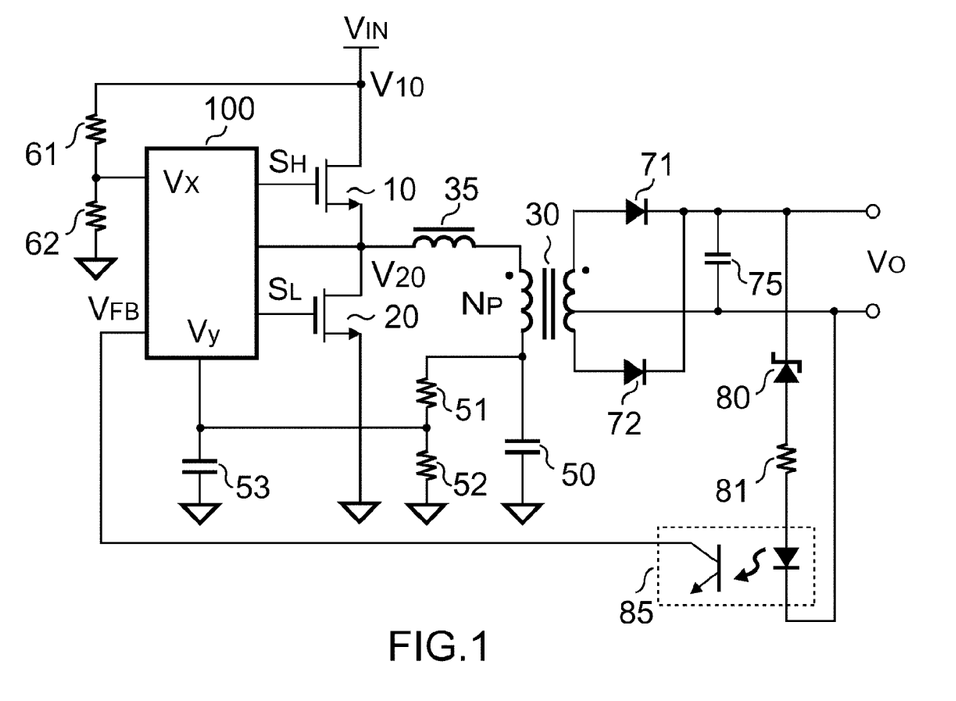
FIG. 1 is a preferred embodiment of an asymmetrical resonant power converter of the present invention.

FIG. 1 is a preferred embodiment of an asymmetrical resonant power converter 1 of the present invention. A capacitor 50 and an inductive device (such as a transformer 30 and its parasitic inductor 35) develop a resonant tank. Transistors 10 and 20 are coupled to switch the resonant tank. Two rectifiers 71 and 72 are connected from the secondary winding of the transformer 30 to an output capacitor 75 for generating an output $V_O$ at the output capacitor 75. A control circuit 100 generates a switching signal (first signal) $S_H$ and a switching signal (second signal) $S_L$ to control the transistors 10 and 20 respectively. The switching frequencies of the switching signals $S_H$ and $S_L$ are changed in accordance with a feedback signal $V_{FB}$ for regulating the output $V_O$ of the power converter. A Zener diode 80, a resistor 81 and an optical-coupler 85 form a feedback circuit coupled to the output $V_O$ of the power converter to generate the feedback signal $V_{FB}$. Furthermore, the control circuit 100 is coupled to detect an input voltage $V_{IN}$ of the power converter via resistors 61 and 62, and an input voltage $V_x$ which is correlated to the input voltage $V_{IN}$ is generated via the resisters 61 and 62. The pulse width of the switching signal $S_L$ is modulated in response to the change of the input voltage $V_{IN}$. The control circuit 100 is further coupled to detect the voltage of the capacitor 50 through resistors 51 and 52 and a capacitor 53 for modulating the switching signals $S_H$, $S_L$ and change the DC bias of the capacitor 50. A DC bias voltage Vy which is correlated to the DC bias of the capacitor 50 is generated via the resisters 51 and 52. The capacitor 50 has a DC bias correlated to the input voltage $V_{IN}$, which will allow the resonant power converter operating in a wide input voltage range. Since the DC bias of the capacitor 50 is correlated to the input voltage $V_{IN}$, the control circuit 100 can detect the input voltage $V_{IN}$ for determining the DC bias of the capacitor 50.

Figure 2:
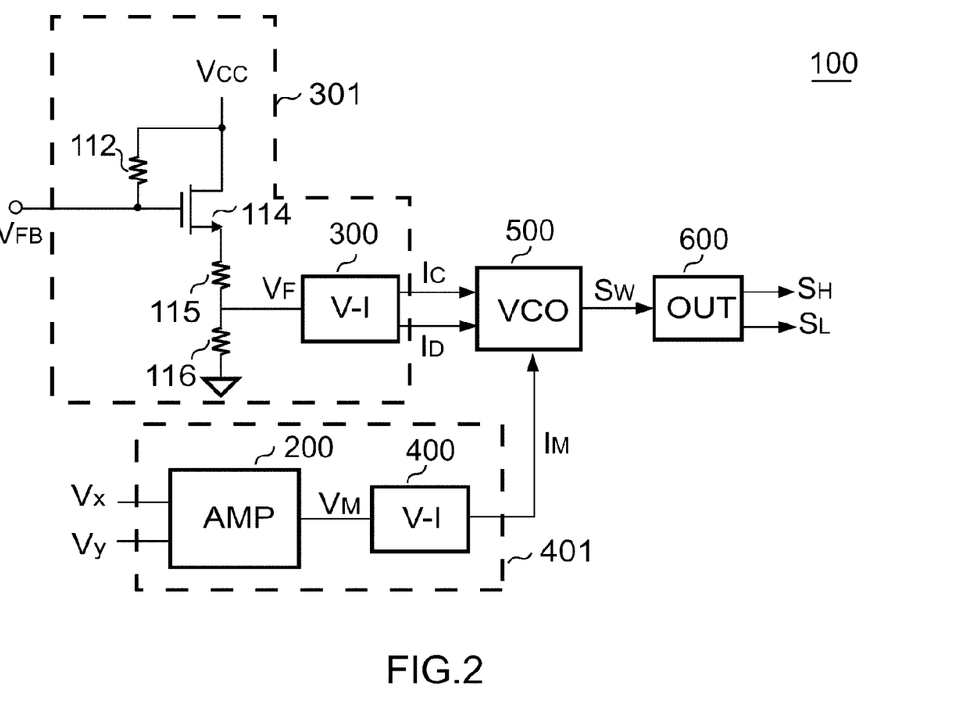
FIG. 2 is a schematic diagram of the control circuit of the invention.

FIG. 2 is a preferred embodiment of the control circuit 100. The control circuit 100 includes a feedback-input circuit 301 coupled to the output $V_O$ of the power converter through the optical-coupler 85 to receive the feedback signal $V_{FB}$. A level-shift circuit and a voltage-to-current converter (V-I) 300 develop the feedback-input circuit 301. A transistor 114 and resistors 112, 115, 116 form the level-shift circuit, and a shifted signal $V_F$ is generated at the output of the level-shift circuit in accordance with the feedback signal $V_{FB}$. An amplification circuit (AMP) 200 and a voltage-to-current converter (V-I) 400 develop a differential circuit 401, which is coupled to detect the input voltage $V_{IN}$ and the voltage of the capacitor 50 for generating a modulation signal $V_M$. An oscillator (VCO) 500 generates an oscillation signal $S_W$ in response to the feedback signal $V_{FB}$. An output circuit (OUT) 600 generates the switching signals $S_H$ and the $S_L$ in accordance with the oscillation signal $S_W$. The pulse width of the switching signal $S_L$ is modulated by the modulation signal $V_M$. The pulse width of the switching signal $S_L$ is decreased in response to the increase of the input voltage $V_{IN}$. Therefore, the DC bias of the capacitor 50 will be increased in response to the increase of the input voltage $V_{IN}$.

The feedback-input circuit 301 generates a charge current $I_C$ and a discharge current $I_D$ in accordance with the feedback signal $V_{FB}$ through the voltage-to-current converter 300. The charge current $I_C$ and the discharge current $I_D$ are connected to the oscillator 500. The charge current $I_C$ determines the on time of the oscillation signal $S_W$, and the discharge current $I_D$ determine the off time of the oscillation signal $S_W$. The voltage-to-current converter 400 generates a modulation current $I_M$ according to the modulation signal $V_M$. The modulation current $I_M$ is coupled to the oscillator 500 to modulate the off time of the oscillation signal $S_W$.

Figure 3:
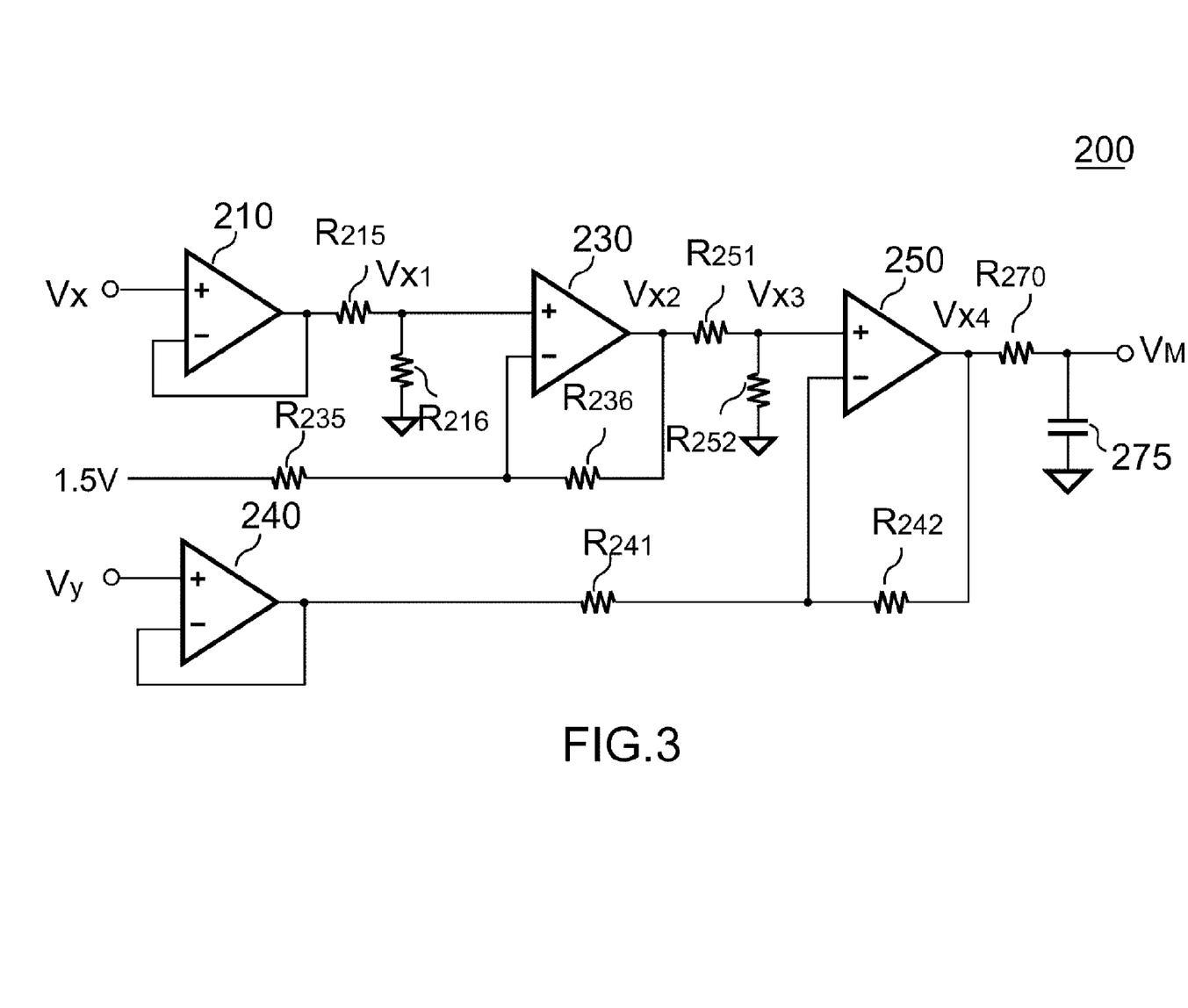
FIG. 3 shows a preferred embodiment of the amplification circuit.

FIG. 3 shows a preferred embodiment of the amplification circuit 200. An operational amplifier (op-amp) 210 is coupled to receive the input voltage $V_X$ via the positive input. The negative input of the op-amp 210 is coupled to the output of the op-amp 210. A resister $R_{215}$ is disposed between the output of the op-amp 210 and the positive input of an op-amp 230, and a resister $R_{216}$ is disposed between the resister $R_{215}$ and ground. The negative input of the op-amp 230 is coupled to receive a reference voltage $V_R$ through a resistor $R_{235}$. In the embodiment, the reference voltage $V_R$ is 1.5V. A resistor $R_{236}$ is connected from the negative input of the op-amp 230 to the output of the op-amp 230. The output of the op-amp 230 is coupled to the positive input of an op-amp 250 through a resistor $R_{251}$, and another resistor $R_{252}$ is connected between the resistor $R_{251}$ and the ground. The negative input of the op-amp 250 is coupled to the output of an op-amp 240 through a resistor $R_{241}$. Another resistor $R_{242}$ is further coupled from the negative input to the output of the op-amp 250. The modulation signal $V_M$ is output from the output of the op-amp 250 through a resistor $R_{270}$ and a capacitor 275 which provide filtering.

Thereby, the modulation signal $V_M$ can be expressed according the following equations:

$$V_{X1} = V_X \times \frac{R_{216}}{R_{215} + R_{216}} \quad (1)$$

$$V_{X2} = V_{X1} \frac{R_{235} + R_{236}}{R_{235}} - 1.5 \times \frac{R_{236}}{R_{235}} \quad (2)$$

$$V_{X3} = (V_{X2}) \times \frac{R_{252}}{R_{251} + R_{252}} \quad (3)$$

$$V_{X4} = \frac{R_{241} + R_{242}}{R_{241}} V_{X3} - \frac{R_{242}}{R_{241}} V_y \quad (4)$$

$V_{X1}$, $V_{X2}$, $V_{X3}$, and $V_{X4}$ in the equations (1)~(4) represent the voltages at the positive input of the op-amp 230, at the output of the op-amp 230, at the positive input of the op-amp 250, and at the output of the amplification circuit 200 respectively.

According to the equation (1)~(3), we write:

$$V_{X4} = \quad (5)$$
$$\left( \frac{R_{241} + R_{242}}{R_{241}} \times \frac{R_{252}}{R_{251} + R_{252}} \times \frac{R_{235} + R_{236}}{R_{235}} \times \frac{R_{216}}{R_{215} + R_{216}} \right) \times V_X -$$
$$\left( \frac{R_{241} + R_{242}}{R_{241}} \times \frac{R_{252}}{R_{251} + R_{252}} \times \frac{R_{236}}{R_{235}} \times 1.5 \right) - \frac{R_{242}}{R_{241}} V_y$$

As we define the $$\frac{R_{241} + R_{242}}{R_{241}} \times \frac{R_{252}}{R_{251} + R_{252}} \times \frac{R_{235} + R_{236}}{R_{235}} \times \frac{R_{216}}{R_{215} + R_{216}} = k_1;$$

$$\frac{R_{241} + R_{242}}{R_{241}} \times \frac{R_{252}}{R_{251} + R_{252}} \times \frac{R_{236}}{R_{235}} = k_2;$$

$$\frac{R_{242}}{R_{241}} = k_3; \text{ and}$$

$$V_M = V_{X4};$$

we obtain:

$$V_M = (k_1 V_X - 1.5 k_2) - k_3 V_y \quad (6)$$

Figure 4:
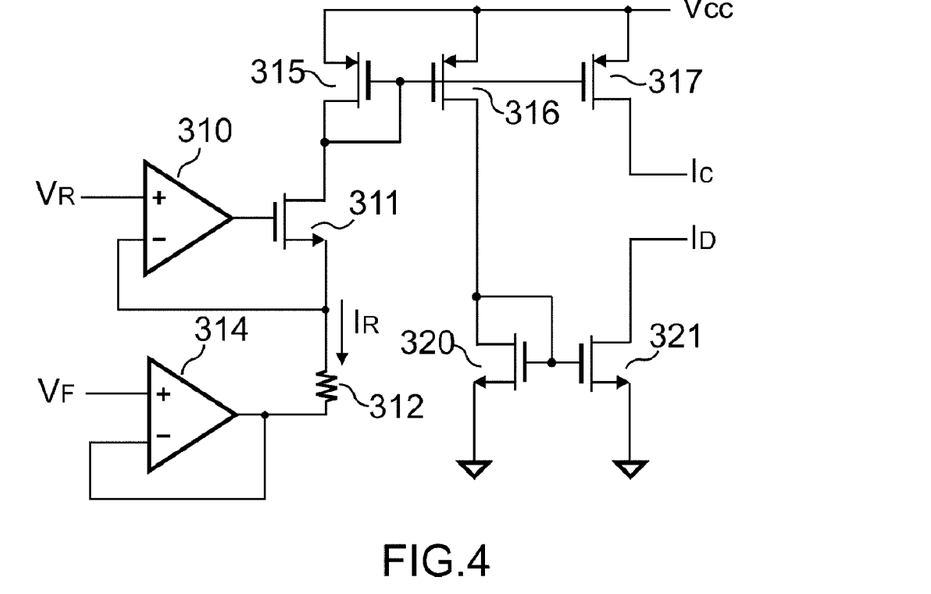
FIG. 4 and FIG. 5 show the circuit schematic of the voltage-to-current converter.
Figure 5:
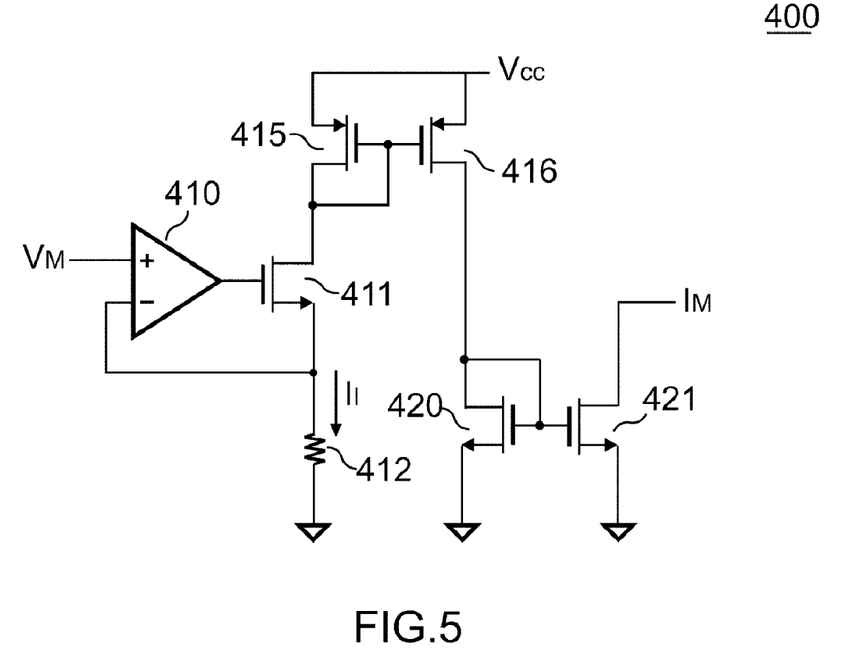

FIG. 4 and FIG. 5 show the circuit schematic of the voltage-to-current converter 300 and 400 respectively. In FIG. 4, the voltage-to-current converter 300 comprises a V-to-I circuit, a first current mirror, and a second current mirror. The V-to-I circuit which is developed by operational amplifiers 310 and 314, a transistor 311, and a resistor 312 generates a V-to-I current $I_R$ at the transistor 311 in accordance with a constant voltage $V_R$ and the shifted signal $V_F$ shifted from the feedback signal $V_{FB}$. The V-to-I current $I_R$ is generated in response to $$\frac{V_R - V_F}{R_{312}},$$

which represents the differential of the constant voltage $V_R$. Accordingly, the shifted signal $V_F$ is converted to the V-to-I current $I_R$. The first current mirror is formed by the transistors 315, 316, and 317. The first current mirror generates charge current $I_C$ in response to the V-to-I current $I_R$. The charge current $I_C$ is proportional to the V-to-I current $I_R$. The second current mirror is formed by the transistors 320 and 321. The second current mirror generates the discharge current $I_D$ in response to the V-to-I current $I_R$. In the embodiment, since the charge current $I_C$ and the discharge current $I_D$ are both mirrored from the V-to-I current $I_R$, the charge current $I_C$ is thus proportional to the discharge current $I_D$. The charge current $I_C$ and the discharge current $I_D$ are decreased in response to the increase of the feedback signal $V_{FB}$.

In FIG. 5, the voltage-to-current converter 400 comprises a V-to-I circuit, and a current mirror. An operational amplifier 410, a transistor 411, and a resistor 312 develop the V-to-I circuit. The operational amplifier 410 is coupled to receive the modulation signal $V_M$ for generating a V-to-I current $I_I$ at the transistor 411. The current mirror is formed by transistors 415, 416, 420, and 421. The V-to-I current $I_I$ is mirrored by the current mirror, and the modulation current $I_M$ is generated in response to the V-to-I current $I_I$.

Figure 6:
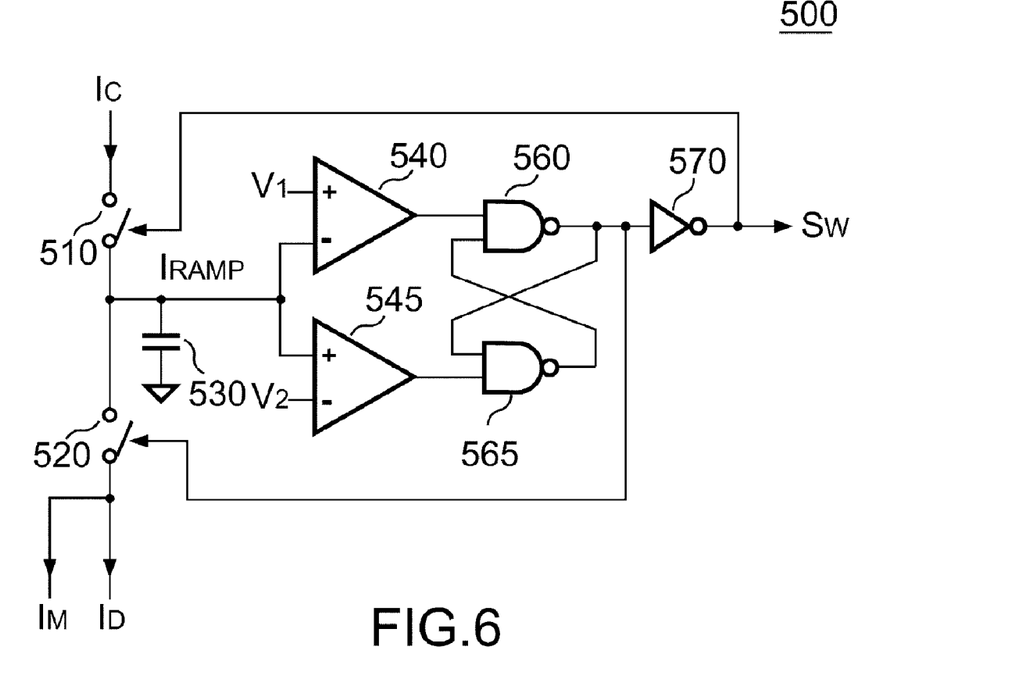
FIG. 6 is a preferred embodiment of the oscillator.

FIG. 6 is a preferred embodiment of the oscillator 500. Two switches 510 and 520, two comparators 540 and 545, two NAND gates 560 and 565, and an inverter 570 form the oscillator 500. When the switch 510 is turned on by the oscillation signal $S_W$, the charge current $I_C$ charges the capacitor 530, and a ramp signal $I_{RAMP}$ is generated. Once the voltage across the capacitor 530 reaches a high-trip point $V_1$ of the comparator 540, the comparator 540 and the NAND gates 560 and 565 are coupled to turn on the switch 520, and the discharge current $I_D$ and the modulation current $I_M$ discharge the capacitor 530. In the meantime, the oscillation signal $S_W$ is also disabled, and the switch 510 is turned off. The discharging is performed continuously until the voltage across the capacitor 530 is lower than a low trip-point voltage $V_2$. The comparator 545 and the NAND gates 565 and 560 are coupled to turn off the switch 520. The oscillation signal $S_W$ generated through the inverter 570 becomes enabled, so that the switch 510 is turned on again.

Figure 7:
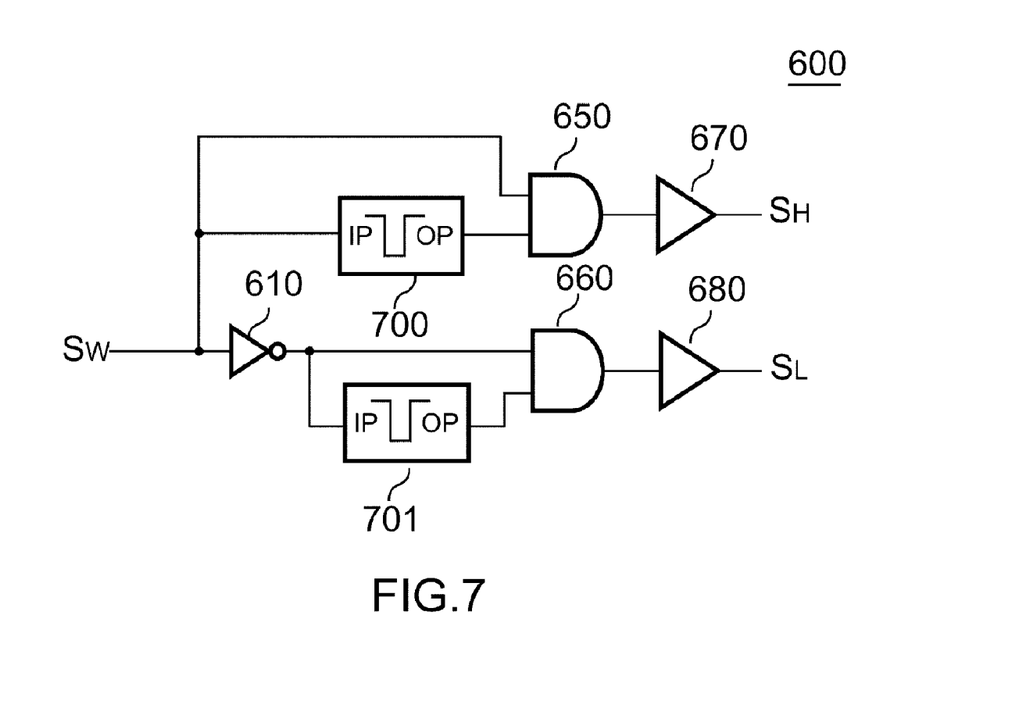
FIG. 7 is a preferred embodiment of the output circuit.

FIG. 7 is a preferred embodiment of the output circuit 600. Two delay circuits 700 and 701, two AND gates 650 and 660, an inverter 610, and two buffers 670 and 680 form the output circuit 600. One input of the AND gate 650 is coupled to receive the oscillation signal $S_W$, and another input of the AND gate 650 is coupled to receive the oscillation signal $S_W$ through the delay circuit 700. The switching signal $S_H$ is generated in response the two inputs of the AND gate 650 through the buffer 670. As for the AND gate 660, one input of the AND gate 660 is coupled to receive the oscillation signal $S_W$ through the inverter 610. Another input of the AND gate 660 is coupled to receive the oscillation signal $S_W$ through the inverter 610 and the delay circuit 701. The switching signal $S_L$ is generated in response to the two inputs of the AND gate 660 through the buffer 680.

Figure 8:
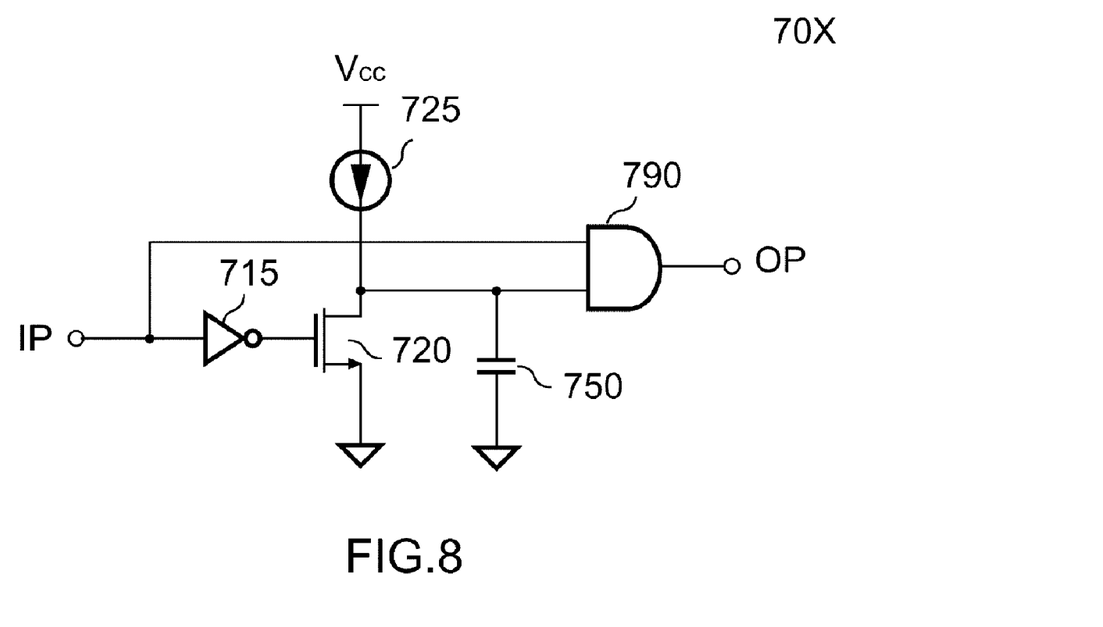
FIG. 8 shows the circuit schematic of delay circuits in FIG. 7.
Figure 9:
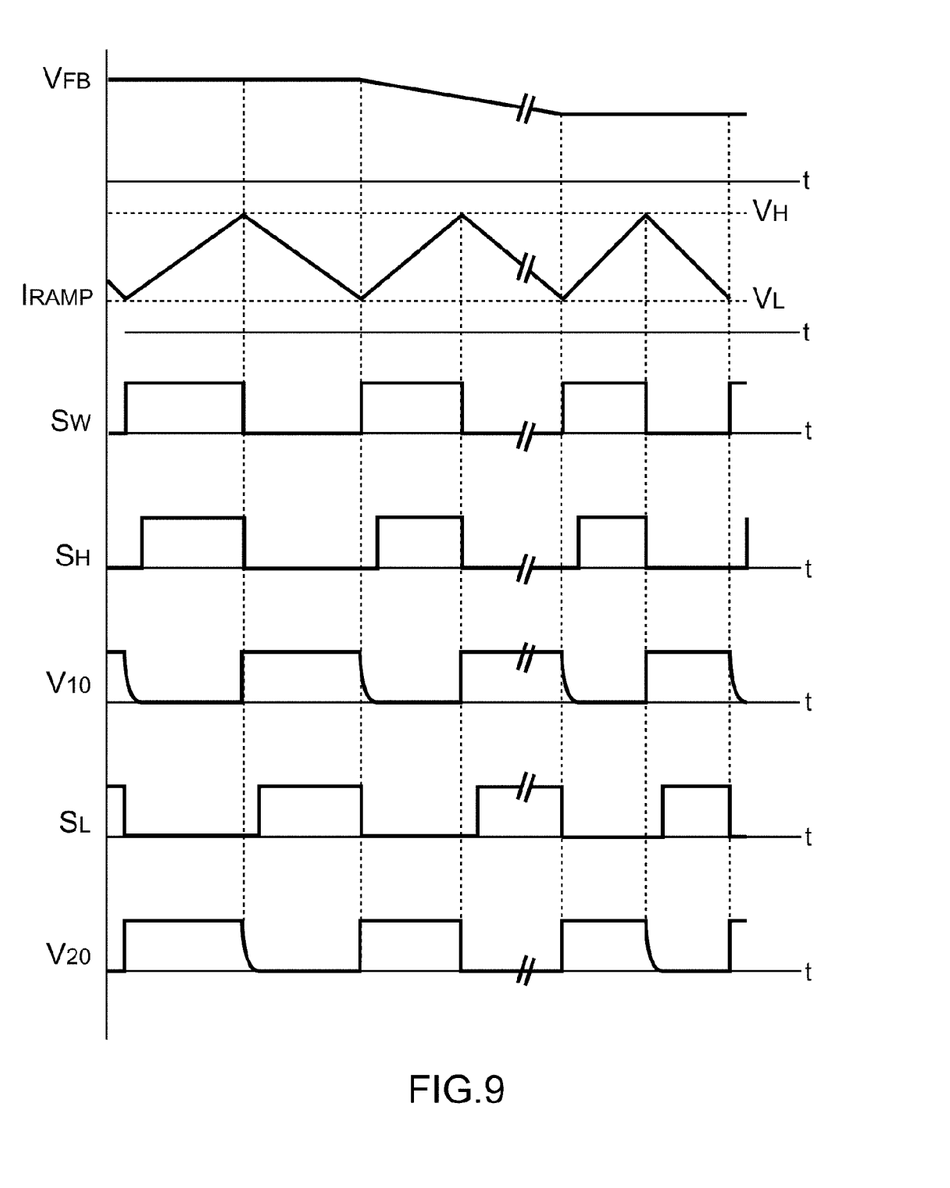
FIG. 9 shows key waveforms of an asymmetrical resonant power according to the present invention.
Figure 10:
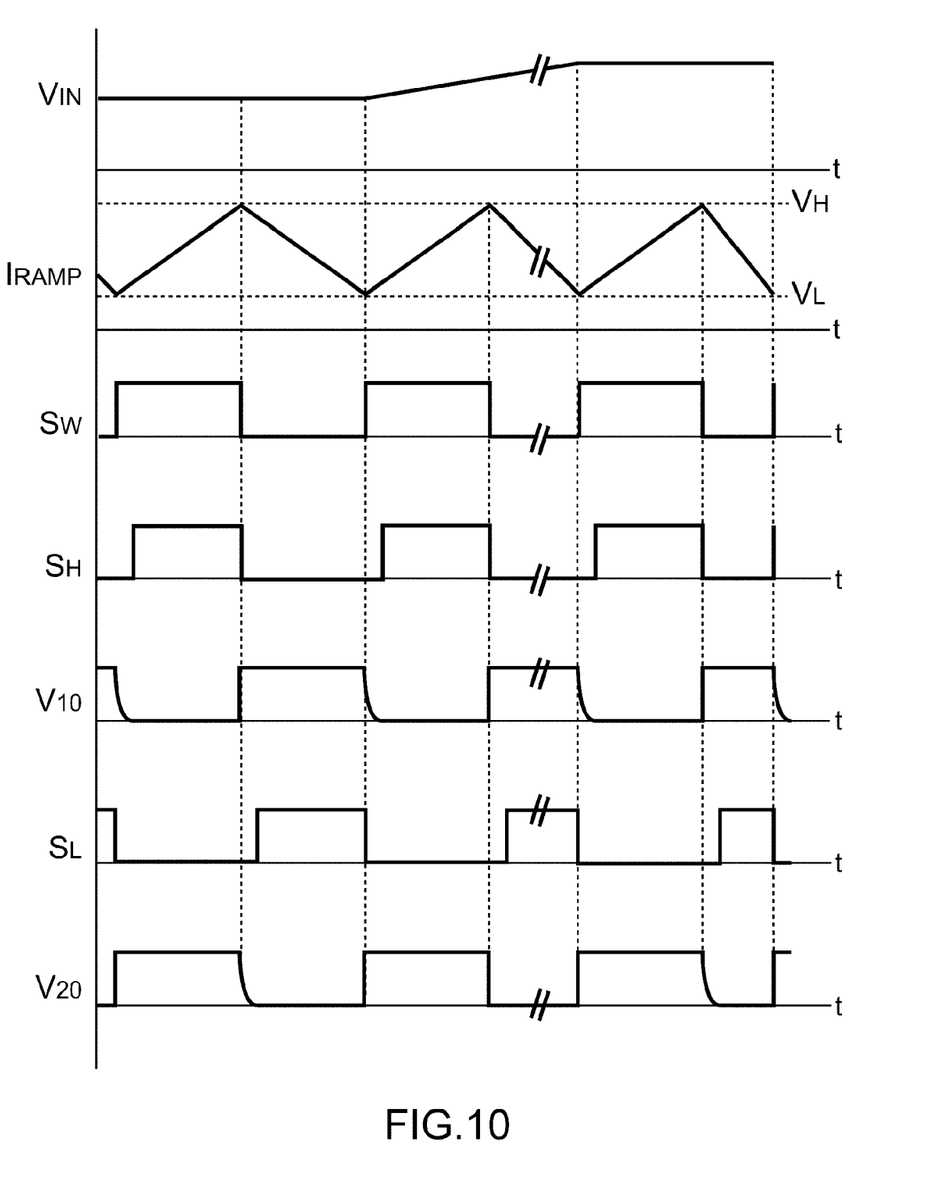
FIG. 10 shows key waveforms of an asymmetrical resonant power according to the present invention.

FIG. 8 shows the circuit schematic of delay circuits 700 and 701 in FIG. 7. Each of the delay circuits 700 and 701 includes an inverter 715, a current source 725, a transistor 720, a capacitor 750, and an AND gate 790. An input terminal IP of each of the delay circuits 700 and 701 is coupled to receive the oscillation signal $S_W$. The oscillation signal $S_W$ is supplied to the inverter 715 and one input of the AND gate 790. The output of the inverter 715 is coupled to a gate of the transistor 720. A drain of the transistor 720 and one terminal of the capacitor 750 are coupled to another input of the AND gate 790. A source of the transistor 720 and the other terminal of the capacitor 750 are coupled to the ground. A delay signal OP is enabled in response to the rising edge of the oscillation signal $S_W$ after a delay time $T_d$. The delay time $T_d$ is determined according to the current value provided by the current source 725 and the capacitance of the capacitor 750.

In practice, referring to FIGS. 1, 2, 4, 6, 7, 8, and 9, when the power converter is converted from heavy load to light load, the output voltage $V_O$ increases, and the level of the feedback voltage $V_{FB}$ decreases. The charge current $I_C$ and the discharge current $I_D$ are increased in response to the decrease of the feedback signal $V_{FB}$. As long as the charge current $I_C$ and the discharge current $I_D$ increases, the charging slope and the discharging slope of the ramp signal $I_{RAMP}$ is also increased. The on time and the off time of the oscillation signal $S_W$ decreases, and the switching period of the oscillation signal $S_W$ is decreased. The switching period of the switching signals $S_H$ and the $S_L$ is also decreased. In other word, the switching frequencies of the switching signals $S_H$ and the $S_L$ are increased.

Referring to FIGS. 1, 2, 3, 5, 6, 7, 8, and 10, when the input voltage $V_{IN}$ increases, the DC bias voltage $V_y$ is increased as well. According to the equation (6) described in FIG. 3, the modulation signal $V_M$ is increased in accordance to the increase of the input voltage $V_{IN}$. The modulation current $I_M$ is also increased in accordance with the increased modulation signal $V_M$. As the modulation current $I_M$ increases, the discharge current $I_D+I_M$ is increased, too. The slope of the signal $I_{ramp}$ is therefore increased at the discharging part of the waveform, and the pulse width of the switching signal $S_L$ (second signal) is decreased in response to the increase of the input voltage $V_{IN}$. As for the decreased pulse width of the switching signal $S_L$ (second signal), the ratio of the switching signal $S_H$ (first signal) of the oscillation signal $S_W$ will be increased, and the DC bias of the capacitor 50 will be increased in response to the increase of the input voltage $V_{IN}$.

According to the invention, when the input voltage of the power converter has a significantly change, the pulse width of the switching signal $S_L$ can be modulated, and the operation might not fall into a none-linear region.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A resonant power converter comprising:
   a capacitor and an inductive device developing a resonant tank;
   a first transistor and a second transistor coupled to switch the resonant tank; and
   a control circuit generating a first signal and a second signal to control the first transistor and the second transistor respectively; in which the frequencies of the first signal and the second signal are changed in accordance with a feedback signal for regulating output of the resonant power converter; and
   wherein the control circuit is further coupled to detect an input voltage of the resonant power converter, and a pulse width of the second signal is modulated in response to change of the input voltage; and the control circuit comprising:
   a feedback-input circuit coupled to the output of the resonant power converter to receive the feedback signal;
   an oscillator generating an oscillation signal in response to the feedback signal;
   an output circuit generating the first signal and the second signal in accordance with the oscillation signal; and
   a differential circuit coupled to input of the resonant power converter and the capacitor for generating a modulation signal;
   wherein the pulse width of the second signal is modulated by the modulation signal; and
   wherein the feedback-input circuit generates a charge current and a discharge current in response to the feedback signal, the charge current and the discharge current are coupled to the oscillator, the charge current determines an on time of the oscillation signal, and the discharge current determines the off time of the oscillation signal.

2. The resonant power converter as claimed in claim 1, wherein the differential circuit generates a modulation current in accordance with the modulation signal, and the modulation current is coupled to the oscillator to modulate the off time of the oscillation signal.

3. The resonant power converter as claimed in claim 1, wherein the pulse width of the second signal is decreased in response to increase of the input voltage.

4. The resonant power converter as claimed in claim 1, wherein a DC bias of the capacitor is increased in response to the increase of the input voltage.

5. A power converter comprising:
   a capacitor and an inductive device developing a resonant tank;
   two transistors coupled to switch the resonant tank; and
   a control circuit generating switching signals coupled to control the transistors;
   wherein frequencies of the switching signals are varied for regulating output of the power converter; and
   wherein the control circuit is coupled to detect a voltage of the capacitor for modulating the switching signals and change a DC bias of the capacitor and the control circuit comprises:

a feedback-input circuit coupled to the output of the power converter to receive a feedback signal; and an oscillator generating an oscillation signal in response to the feedback signal, wherein the feedback-input circuit generates a charge current and a discharge current in response to the feedback signal, the charge current and the discharge current are coupled to the oscillator, the charge current determines an on time of the oscillation signal, and the discharge current determines the off time of the oscillation signal.

6. The power converter as claimed in claim 5, wherein the control circuit is further coupled to detect an input voltage of the power converter for determining the DC bias of the capacitor.

7. The power converter as claimed in claim 5, wherein pulse widths of the switching signals are varied for determining the DC bias of the capacitor.

8. The power converter as claimed in claim 5, wherein the control circuit further comprising:

an output circuit generating the switching signals in accordance with the oscillation signal; and a differential circuit coupled to an input of the power converter and the capacitor for generating a modulation signal;

wherein pulse widths of the switching signals are modulated by the modulation signal.

9. The power converter as claimed in claim 5, wherein a pulse width of one of the switching signals is changed in response to the change of the input voltage.

10. The power converter as claimed in claim 5, in which the DC bias of the capacitor is changed in response to the change of the input voltage.

* * * * *